United States Patent
Soldner et al.

(10) Patent No.: US 12,149,825 B1
(45) Date of Patent: Nov. 19, 2024

(54) LATENCY REDUCTION ARCHITECTURE USING MULTIPLE MOTION SENSORS

(71) Applicant: Apple Inc., Cupertino, CA (US)

(72) Inventors: Nicholas C. Soldner, Mountain View, CA (US); Joseph Cheung, Cupertino, CA (US); Jose A. Rios, Cupertino, CA (US); Stergios Roumeliotis, Los Altos Hills, CA (US); Qing He, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/934,324

(22) Filed: Sep. 22, 2022

Related U.S. Application Data

(60) Provisional application No. 63/261,610, filed on Sep. 24, 2021.

(51) Int. Cl.
| | |
|---|---|
| *H04N 23/68* | (2023.01) |
| *G01S 17/89* | (2020.01) |
| *G01S 19/47* | (2010.01) |
| *G06F 3/01* | (2006.01) |
| *G06T 7/207* | (2017.01) |

(52) U.S. Cl.
CPC ......... *H04N 23/6812* (2023.01); *G01S 17/89* (2013.01); *G01S 19/47* (2013.01); *G06F 3/01* (2013.01); *G06T 7/207* (2017.01)

(58) Field of Classification Search
CPC ..... H04N 23/6812; G01S 17/89; G01S 19/47; G06T 7/207; G01C 21/005; G06F 3/01; G06F 3/011; G06F 3/012; G06F 3/013
See application file for complete search history.

(56) References Cited

U.S. PATENT DOCUMENTS

| | | | |
|---|---|---|---|
| 9,230,504 B2 * | 1/2016 | Kim | B60K 35/00 |
| 10,712,446 B1 * | 7/2020 | Bills | H04N 23/56 |

(Continued)

FOREIGN PATENT DOCUMENTS

| | | | |
|---|---|---|---|
| CN | 113267186 A | 8/2021 | |
| WO | WO-2019072598 A1 * | 4/2019 | ............ G11B 27/10 |

OTHER PUBLICATIONS

Kongsberg Maritime AS, "Kongsberg EM Series Multibeam echo sounder," Sep. 2010.

*Primary Examiner* — Darlene M Ritchie
(74) *Attorney, Agent, or Firm* — Blank Rome LLP

(57) ABSTRACT

A processing unit of an electronic device may transmit a synchronization pulse to each of a first plurality of motion sensors (e.g., Inertial Measurement Units or IMUs) communicatively coupled to the processing unit, wherein the synchronization pulse transmitted to each motion sensor of the first plurality of motion sensors is assigned an offset time amount by the processing unit. The processing unit then obtains motion information samples from each of the first plurality of motion sensors, e.g., in an order corresponding to the offset time amounts assigned to the respective motion sensors, and then performs a processing operation based upon the obtained motion information samples. In some embodiments, each motion sensor may be assigned an equal offset time amount. In other embodiments, the offset time amount assigned to each motion sensor may be individually determined, e.g., based on one or more conditions, settings, or preferences related to the electronic device.

20 Claims, 6 Drawing Sheets

(56) References Cited

U.S. PATENT DOCUMENTS

| | | | |
|---|---|---|---|
| 10,771,669 B1* | 9/2020 | Balasubramanian | ... G01S 17/87 |
| 2010/0204974 A1* | 8/2010 | Israelsen | ............. G01S 17/89 |
| | | | 703/17 |
| 2016/0316145 A1* | 10/2016 | Kang | ............. H04N 23/6812 |
| 2017/0336439 A1* | 11/2017 | Li | ............. G01S 5/0294 |
| 2021/0080259 A1 | 3/2021 | Babu | |
| 2021/0293546 A1* | 9/2021 | Zhang | ............. G01C 21/383 |
| 2022/0018962 A1* | 1/2022 | Pan | ............. G01S 17/931 |
| 2022/0244072 A1* | 8/2022 | Slatcher | ............. G01C 21/005 |
| 2023/0072555 A1* | 3/2023 | Faust | ............. H04N 13/243 |

* cited by examiner

LATENCY REDUCTION ARCHITECTURE USING MULTIPLE MOTION SENSORS

BACKGROUND

This disclosure relates generally to the field of latency reduction in electronic devices, and, more specifically, to the field of latency reduction in the processing of motion information samples, e.g., in applications such as visual inertial odometry (VIO) or simultaneous localization and mapping (SLAM), wherein so-called "motion-to-photon latency" is a key parameter affecting user comfort level and overall experience.

The time required to sense, transmit, and process camera and motion sensor information data can take on the order of several milliseconds and may be a function of one or more of: sensor output data rates (ODRs), the speed of a device's communications bus, processor loads, and/or particular software implementations for processing such data. Empirical studies have indicated that motion-to-photon latency values of 20 milliseconds or greater result in reduced user comfort levels, while latency values of less than 10 milliseconds are preferred.

A typical motion sensor, e.g., an Inertial Measurement Unit or IMU, may comprise a 3-axis accelerometer and a 3-axis gyroscope. A typical IMU may be capable of outputting motion information samples at rates of up to 1 kHz (i.e., 1,000 samples a second, or 1 sample per millisecond). In order to reduce noise in the sensed motion information sample values, however, lower data rates (e.g., 800 Hz) and/or low-pass filtering can be utilized. However, low-pass filters can add significant latency to the acquisition of motion information samples, e.g., on the order of 4-10 milliseconds.

Thus, what is needed are techniques to reduce the latency (and/or increase the accuracy) of motion information samples obtained by electronic devices in communication with a plurality of motion sensors. Ideally, such techniques may be able to dynamically modify the overall system latency and/or accuracy characteristics with respect to motion information samples, e.g., according to the preferences of a user or one or more current conditions, settings, or preferences related to the electronic device.

SUMMARY

In one embodiment, a method for motion information sampling latency reduction in the context of an electronic device in communication with a plurality of motion sensors is described. The method may include: transmitting, from a processing unit of an electronic device, a synchronization pulse to each of a first plurality of motion sensors communicatively coupled to the processing unit, wherein the synchronization pulse transmitted to each motion sensor of the first plurality of motion sensors is assigned an offset time amount by the processing unit; obtaining, at the processing unit, motion information samples from each of the first plurality of motion sensors, wherein the motion information samples are obtained in an order corresponding to the offset time amounts assigned to the respective motion sensors; and performing, by the processing unit, a processing operation based, at least in part, upon the obtained motion information samples.

In another embodiment, the method may be embodied in computer executable program code and stored in a non-transitory storage device. In yet another embodiment, the method may be implemented in an electronic device, such as a system comprising system, comprising one or more processing units, a first plurality of motion sensors, and one or more computer readable media.

DETAILED DESCRIPTION

Figure 1:
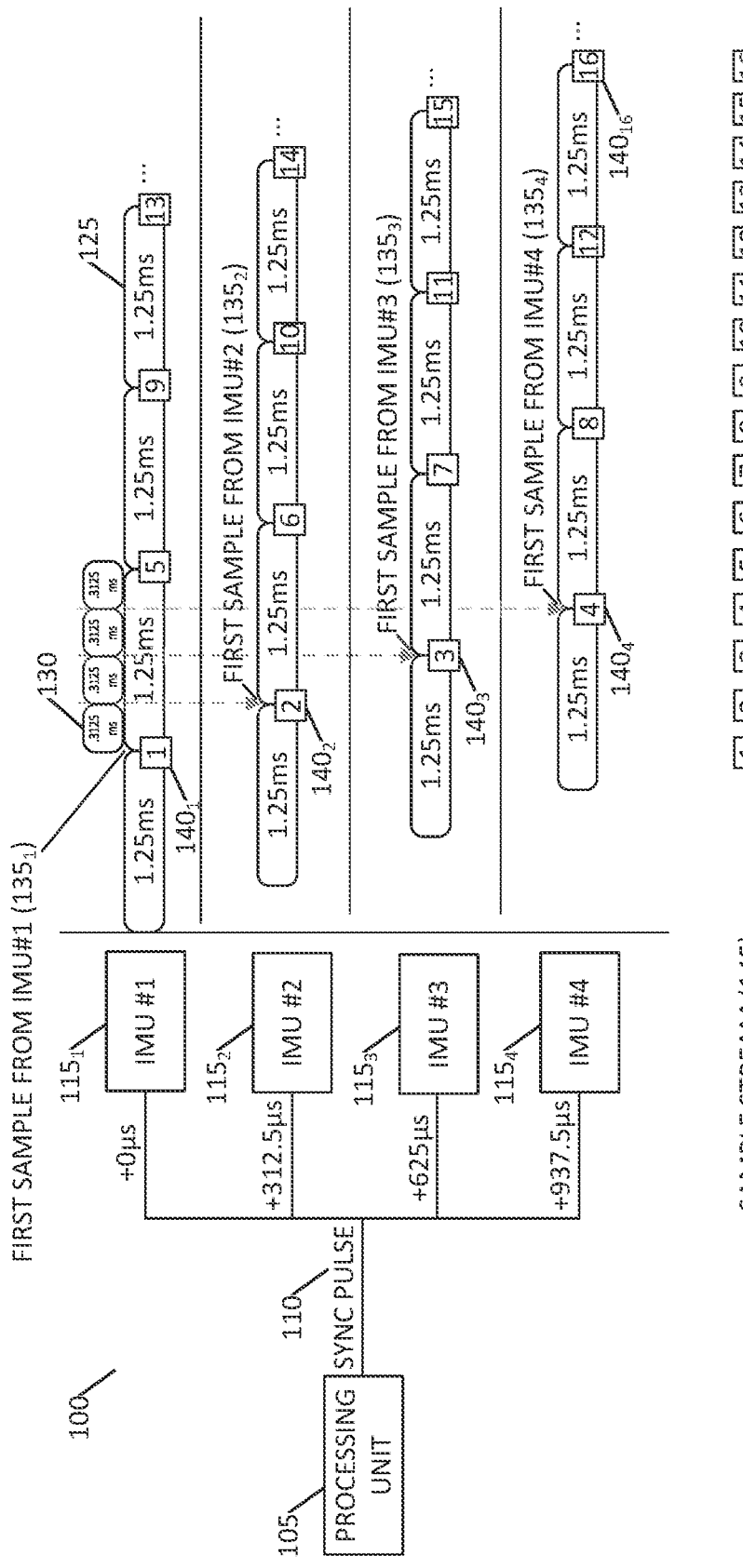
FIG. 1 shows an exemplary offset synchronization timeline, according to one or more embodiments.

This disclosure is directed to systems, methods, and computer readable media for reducing latency in the obtaining of motion information samples for devices in communication with a plurality of motion sensors (e.g., IMUs). In some use cases or applications, such as visual inertial odometry (VIO) or simultaneous localization and mapping (SLAM), reducing motion-to-photon latency is a key factor in improving user comfort level and overall experience. Pose prediction operations also benefit from low latency motion samples and can perform late-stage pose updates to displayed content with less latency. By leveraging the time synchronization inputs of a plurality of motion sensors of an electronic device (e.g., a handheld device, a remotely-controlled device, or a wearable device, such as a head mounted device (HMD), or the like), the techniques described herein outline an architecture that enables reduced latency and lower-noise motion information samples. In some embodiments described herein, a dynamic and flexible architecture is outlined, which enables the electronic device to 'fine tune' and/or balance the degree to which it prefers to reduce latency in obtaining the motion information samples and the degree to which it prefers to generate lower-noise (i.e., more accurate) motion information samples, e.g., based on one or more conditions, settings, or preferences related to the electronic device.

In some embodiments, each motion sensor in a first plurality of motion sensors communicatively coupled to a processing unit of an electronic device may be assigned an equal offset time amount (also referred to herein as an "aligned" or "coherent" synchronization timeline). In some such cases, the processing operation may comprise performing an averaging operation on the obtained motion information samples.

In other embodiments, each motion sensor in the first plurality of motion sensors may be assigned a different offset time amount than the other motion sensors in the first plurality of motion sensors (also referred to herein as an "offset" or "staggered" synchronization timeline). In some such cases, the processing operation may also comprise performing a time-averaging operation on the obtained motion information samples.

In still other embodiments, the first plurality of motion sensors comprises a first group of motion sensors and a second group of motions sensors. In some such cases, each motion sensor in the first group of motion sensors may be assigned an equal offset time amount, while each motion sensor in the second group of motion sensors may be assigned a different offset time amount than the other motion sensors in the second group (such a combination of offset motion sensors also referred to herein as a "hybrid" synchronization timeline, as it possesses aspects of, and can result in the benefits of, both an offset and an aligned synchronization timeline configuration). In some examples of hybrid synchronization timeline configurations, the offset time amount assigned to each motion sensor in the first plurality of motion sensors may be individually determined based, at least in part, on one or more conditions, settings, or preferences related to the electronic device. For example, in some instances, the greatest possible accuracy may be desired, while, in other instances, the lowest possible latency between motion information samples may be desired (while, in still other instances, timeline configurations coming in anywhere in between those two performance extremes may be desired).

In some embodiments, the electronic device further comprises at least one image sensor device, e.g., a camera system, wherein the at least one image sensor device is synchronized with at least one of the plurality of motion sensors. In other embodiments, the at least one image sensor device is not synchronized with at least one of the plurality of motion sensors.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers refer to all instances of the drawing element with identifiers. Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and it may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that, in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, a "camera system" may include more than one cameras, such as a stereo camera system, a multi-camera system, or a camera system capable of sensing the depth of a captured scene.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system (e.g., an HMD) may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In a given XR environment, the image data captured by one or more camera systems in communication with an electronic device rendering such a XR environment may or may not be time synchronized with at least one of the plurality of motion sensors in communication with the electronic device. Therefore, reducing the latency between motion information samples and/or increasing the accuracy of the obtained motion information samples may be a key factor in the electronic device being able to present a comfortable (and accurate) audiovisual experience to a viewer or user of such a XR environment, e.g., one that is substantially free from perceptible lag or unrealistic movements of virtual objects within the XR environment. To achieve such goals may require the use of a system comprising a plurality of motion sensors. Disclosed herein are exemplary motion sensor control schemes and architectures that may be utilized to determine and enforce precise offset time amounts for each motion sensor and then perform appropriate processing operations based on the motion information samples obtained from the plurality of motion sensors.

Turning now to FIG. 1, an exemplary offset synchronization timeline 120 is shown, according to one or more embodiments. In FIG. 1, an exemplary electronic device 100 comprises a processing unit 105 that sends a first synchronization pulse 110 to a first plurality of motion sensors, i.e., IMU #1 ($115_1$), IMU #2 ($115_2$), IMU #3 ($115_3$), and IMU #4 ($115_4$). In the exemplary offset synchronization timeline 120, each of the motion sensors 115 has an exemplary output data rate (ODR) of 800 Hz, i.e., each motion sensor is capable of outputting a new motion information sample every 1.25 milliseconds. It is to be understood that the use of 800 Hz in this example is purely exemplary, and other ODRs are possible, as well as systems having motion sensors capable of different maximum ODRs.

Because synchronization timeline 120 illustrates an example of an "offset" or "staggered" timeline approach, it may be seen that each of the motion sensors 115 are offset from synchronization pulse 110 from each other by a different amount. In this example, IMU #1 ($115_1$) is offset from synchronization pulse 110 by 0 microseconds, IMU #2 ($115_2$) is offset by 312.5 microseconds, IMU #3 ($115_3$) is offset by 625 microseconds, and IMU #4 ($115_4$) is offset by 937.5 microseconds. (It may be understood that, in this example, the offsets represent dividing up the 1.25 millisecond, i.e., 1,250 microsecond, interval between output data samples for each 800 Hz ODR IMU into four evenly-divided portions of 312.5 microseconds each.) It is to be understood that, according to some offset determination algorithms, the determined offset amounts for each motion sensor may comprise "positive" and/or "negative" offset values, i.e., with respect to a common defined timeline point.

Based on the exemplary offset time amounts assigned to the various IMUs 115 in FIG. 1, it may now be seen that the first sample from IMU #1 ($135_1$) will be obtained at time point 1 ($140_1$), while the first sample from IMU #2 ($135_2$) will be obtained 0.3125 milliseconds, i.e., 312.5 microseconds (as shown at block 130), later, at time point 2 ($140_2$), and so forth, with the first sample from IMU #3 ($135_3$) being obtained at time point 3 ($140_3$), and the first sample from IMU #4 ($135_4$) being obtained at time point 4 ($140_4$). This pattern of received motion information samples may then repeat by obtaining the second sample from IMU #1 ($135_1$) at time point 5, and so forth, until the final sample in the example of FIG. 1 is obtained from IMU #4 ($135_4$) at time point 16 ($140_{16}$). As may now be appreciated, in the exemplary configuration of timeline 120, electronic device 100 will have received 16 uniquely-timed motion information samples in the amount of time that a single motion sensor operating with an 800 Hz ODR would have obtained just 4 motion information samples, i.e., a 4× improvement in latency. As illustrated visually in sample stream 145, the 16 uniquely-timed motion information samples in the example illustrated in FIG. 1 are evenly spaced with 312.5 microseconds between each individual sample.

As mentioned above, in some instances, greater accuracy (i.e., rather than lower latency) may be desired from the multi-motion sensor systems described here. One way to achieve less-noisy and/or more accurate motion information samples is to take multiple synchronized motion samples and then average across the motion sample values obtained at each time point. In some cases, using such time averaging techniques may reduce error by a factor of sqrt(n), wherein n is the number of motion information samples being averaged at a given time point.

Figure 2:
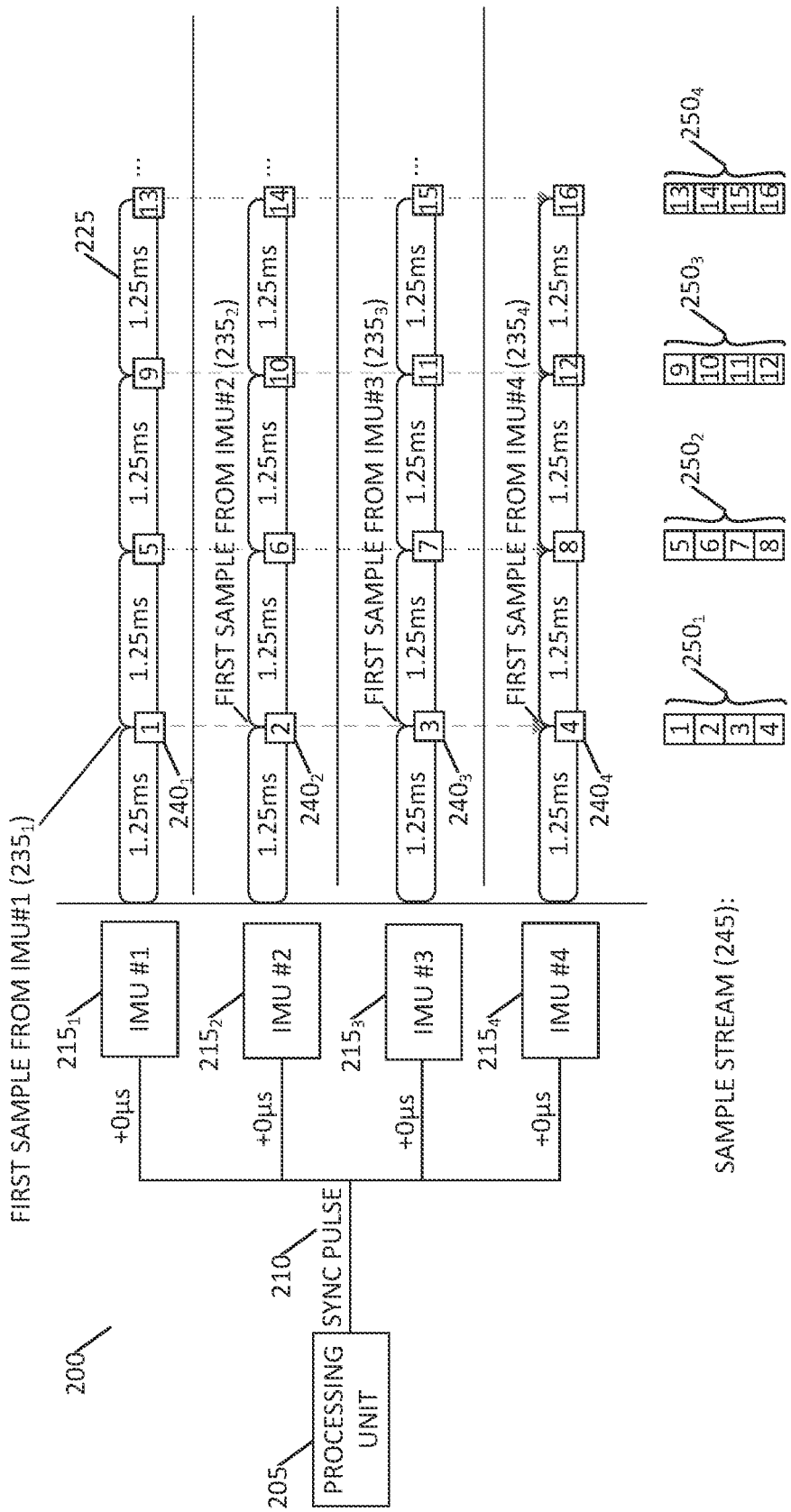
FIG. 2 shows an exemplary aligned synchronization timeline, according to one or more embodiments.

Turning now to FIG. 2, an exemplary aligned synchronization timeline 220 is shown, according to one or more embodiments. In FIG. 2, an exemplary electronic device 200 comprises a processing unit 205 that sends a first synchronization pulse 210 to a first plurality of motion sensors, i.e., IMU #1 ($215_1$), IMU #2 ($215_2$), IMU #3 ($215_3$), and IMU #4 ($215_4$). In the exemplary offset synchronization timeline 220, each of the motion sensors 215 again has an exemplary output data rate (ODR) of 800 Hz, i.e., each motion sensor is capable of outputting a new motion information sample every 1.25 milliseconds. However, because synchronization timeline 220 illustrates an example of an "aligned" or "coherent" timeline approach, it may be seen that each of the motion sensors 215 are offset from synchronization pulse 210 from each other by the same amount, i.e., 0 microseconds, in this example. In other words, each of IMU #1 ($215_1$), IMU #2 ($215_2$), IMU #3 ($215_3$) and IMU #4 ($215_4$) are offset by 0 microseconds.

Based on the exemplary offset time amounts assigned to the various IMUs 215 in FIG. 2, it may now be seen that the first sample from IMU #1 ($235_1$) will be obtained at time point 1 ($240_1$), which is the same moment that the first sample from IMU #2 ($235_2$) will be obtained at time point 2 ($240_2$), as well as the same moment that the first sample from IMU #3 ($235_3$) will be obtained at time point 3 ($240_3$), and that the first sample from IMU #4 ($235_4$) will be obtained at time point 4 ($240_4$). That is, each IMU's first motion information sample will be obtained 1.25 milliseconds, i.e., 1,250 microseconds, after the initial synchronization pulse 210. This pattern of received motion information samples may then repeat by obtaining the second sample from each IMU (235) 1.25 milliseconds later (as shown at time points 5/6/7/8), the third sample from each IMU (235) 1.25 milliseconds after that (as shown at time points Sep. 10, 2011/12), and so forth, until the final samples in the example of FIG. 2 are obtained from each IMU (235) 1.25 milliseconds after that (as shown at time points 13/14/15/16).

As may now be appreciated, in the exemplary configuration of timeline 220, electronic device 200 will have received 16 motion information samples, in the form of four groups of four samples each, at four unique time points. As compared to a single motion sensor operating with an 800 Hz ODR, the embodiment shown in FIG. 2 would achieve a sqrt(4) improvement in motion information sample accuracy, i.e., a 2× improvement in accuracy, while still having the latency as a single-IMU system. As illustrated visually in sample stream 245, the 16 motion information samples obtained in the example illustrated in FIG. 2 may be divided into four commonly-timed motion information sample groups (i.e., motion information sample groups $250_1$-$250_4$), which are evenly-spaced, with 1.25 milliseconds between each group. As mentioned above, the motion information samples within each motion information sample group 250 may be combined in any desired manner (e.g., by computing an average, by computing a median, by a 'voting' system designed to reject outlier values and computing an average of non-outlier values, etc.) in order to obtain a representative motion information sample value for a given time point.

Figure 3A:
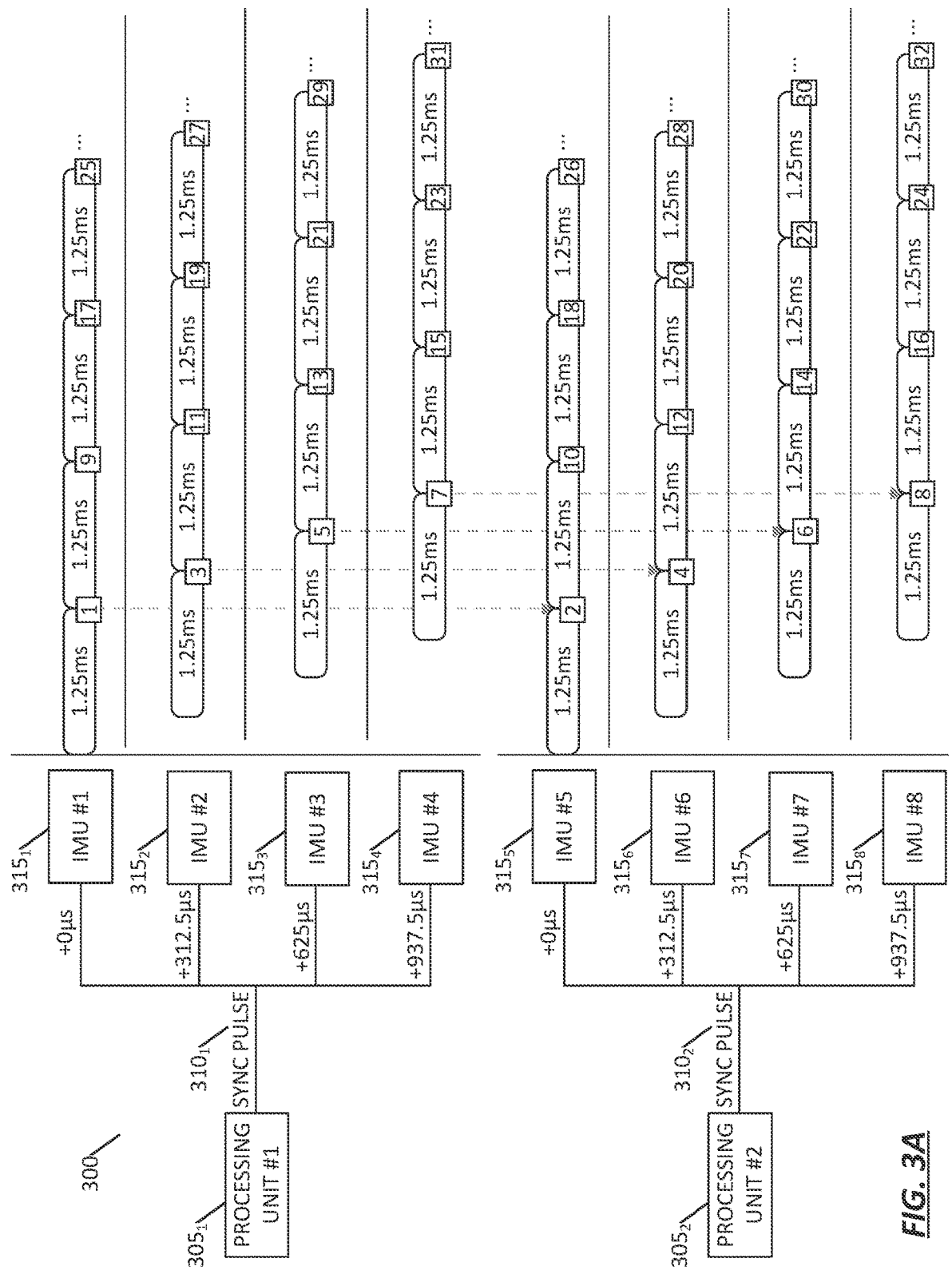
FIG. 3A shows an exemplary hybrid synchronization timeline, according to one or more embodiments.

FIG. 3A shows an exemplary hybrid synchronization timeline 300, according to one or more embodiments. In the example of FIG. 3A, an electronic device possesses eight distinct motion sensors, i.e., IMUs #1-IMUs #8 (labeled $315_1$-$315_8$), divided into two groups. A first group comprises IMU #1-IMU #4 (i.e., $315_1$-$315_4$), as controlled by processing unit $305_1$ and driven by synchronization pulse $310_1$, and a second group comprises IMU #5-IMU #8 (i.e., $315_5$-$315_8$), as controlled by processing unit $305_2$ and driven by synchronization pulse $310_2$. In some embodiments, the multiple processing units $305_1$ and $305_2$ may be synchronized together via a separate synchronization mechanism (not illustrated). It is to be understood that, in different implementations, it is also possible that one processing unit could drive all of the groups of IMUs with a single synchronization pulse signal.

As illustrated in FIG. 3A, each of the first and second groups of motion sensors is configured identically to the exemplary offset synchronization timeline 120, described above with reference to FIG. 1. However, the architecture illustrated in FIG. 3A is referred to herein as "hybrid," as it receives both the benefits of a 4× improvement in latency over a single 800 Hz IMU (as described above with reference to FIG. 1), but also a sqrt(2), or 1.41×, improvement in accuracy over a single 800 Hz IMU (as described above with reference to FIG. 2), owing to the fact that the example embodiment illustrated in FIG. 3A has two motion information samples to average at each of the 16 unique time points (i.e., the motion samples from time points 1 and 2 may be averaged, the motion samples from time points 3 and 4 may be averaged, the motion samples from time points 5 and 6 may be averaged, and so forth, up to the motion samples from the time points labeled 31 and 32 in FIG. 3A).

Figure 3B:
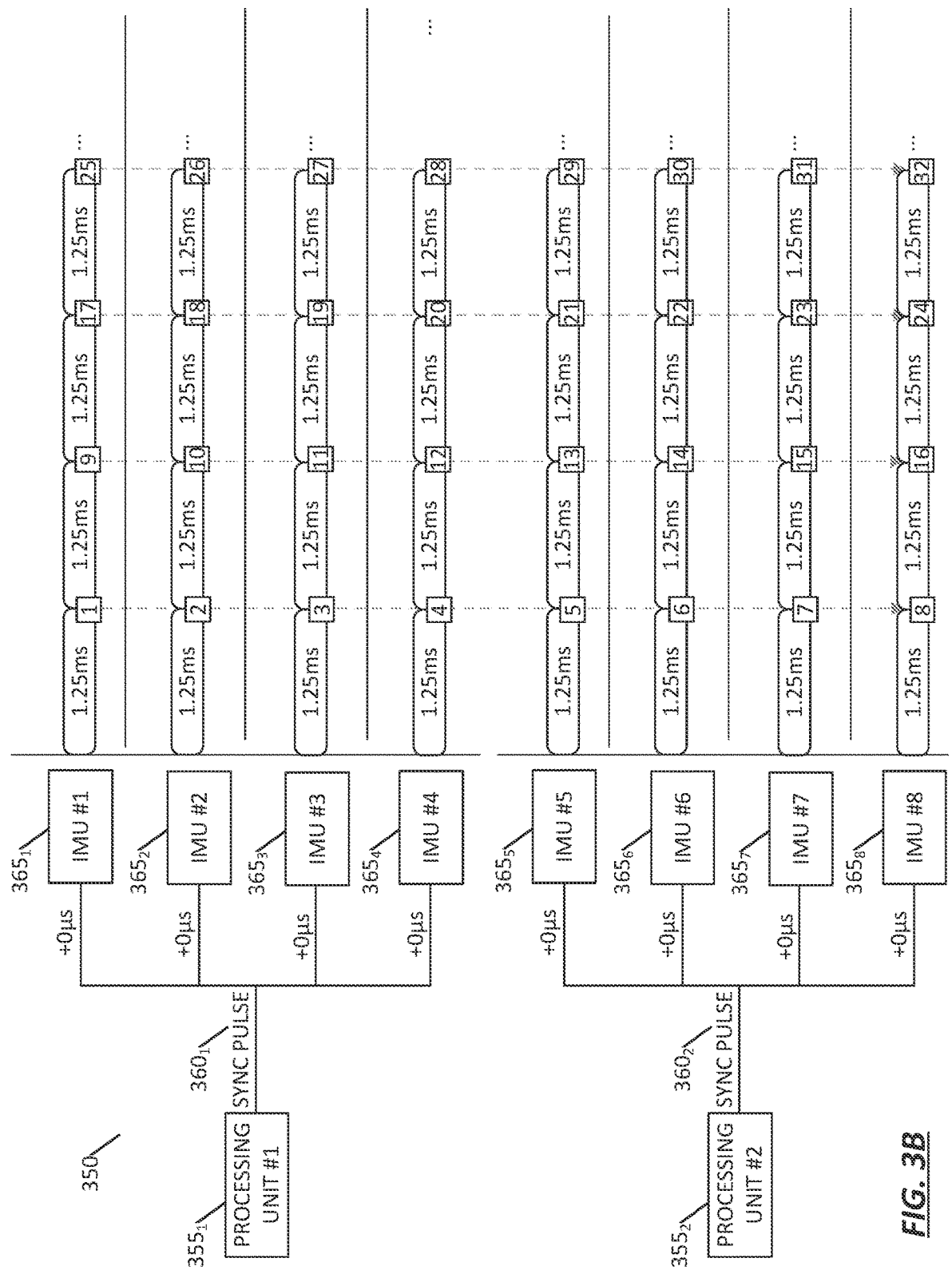
FIG. 3B shows another exemplary aligned synchronization timeline, according to one or more embodiments.

FIG. 3B shows another exemplary aligned synchronization timeline 350, according to one or more embodiments. In the example of FIG. 3B, an electronic device again possesses eight distinct motion sensors, i.e., IMUs #1-IMUs #8 (labeled $365_1$-$365_8$), divided into two groups. A first group comprises IMU #1-IMU #4 (i.e., $365_1$-$365_4$), as controlled by processing unit $355_1$ and driven by synchronization pulse $360_1$, and a second group comprises IMU #5-IMU #8 (i.e., $365_5$-$365_8$), as controlled by processing unit $355_2$ and driven by synchronization pulse $360_2$. In some embodiments, the multiple processing units $355_1$ and $355_2$ may be synchronized together via a separate synchronization mechanism (not illustrated). It is to be understood that, as described with reference to FIG. 3A above, in different implementations, it is also possible that one processing unit could drive all of the groups of IMUs with a single synchronization pulse signal.

As illustrated in FIG. 3B, each of the first and second groups of motion sensors is configured identically to the exemplary aligned synchronization timeline 220, described above with reference to FIG. 2. However, in the architecture illustrated in FIG. 3B is referred to herein as "hybrid," the device benefits from a sqrt(8), or 2.83×, improvement in accuracy over a single 800 Hz IMU (as described above with reference to FIG. 2), owing to the fact that the example embodiment illustrated in FIG. 3B has eight motion information samples to average at each of the 4 unique time points (i.e., the motion samples from time points 1-8 may be averaged, the motion samples from time points 9-16 may be averaged, the motion samples from time points 17-24 may be averaged, and the motion samples from time points 25-32 may be averaged). The example architecture of FIG. 3B provides an example of a scenario or application wherein an electronic device may want maximum motion sample accuracy, but not be as concerned with reducing latency. As described above, FIGS. 3A and 3B provide but just particular examples of the dynamic configurations that an electronic device could employ to individually configure the offset time amounts for its motion sensors, e.g., depending on the latency and/or accuracy needs of a given application or use case the electronic device is facing.

Figure 4:
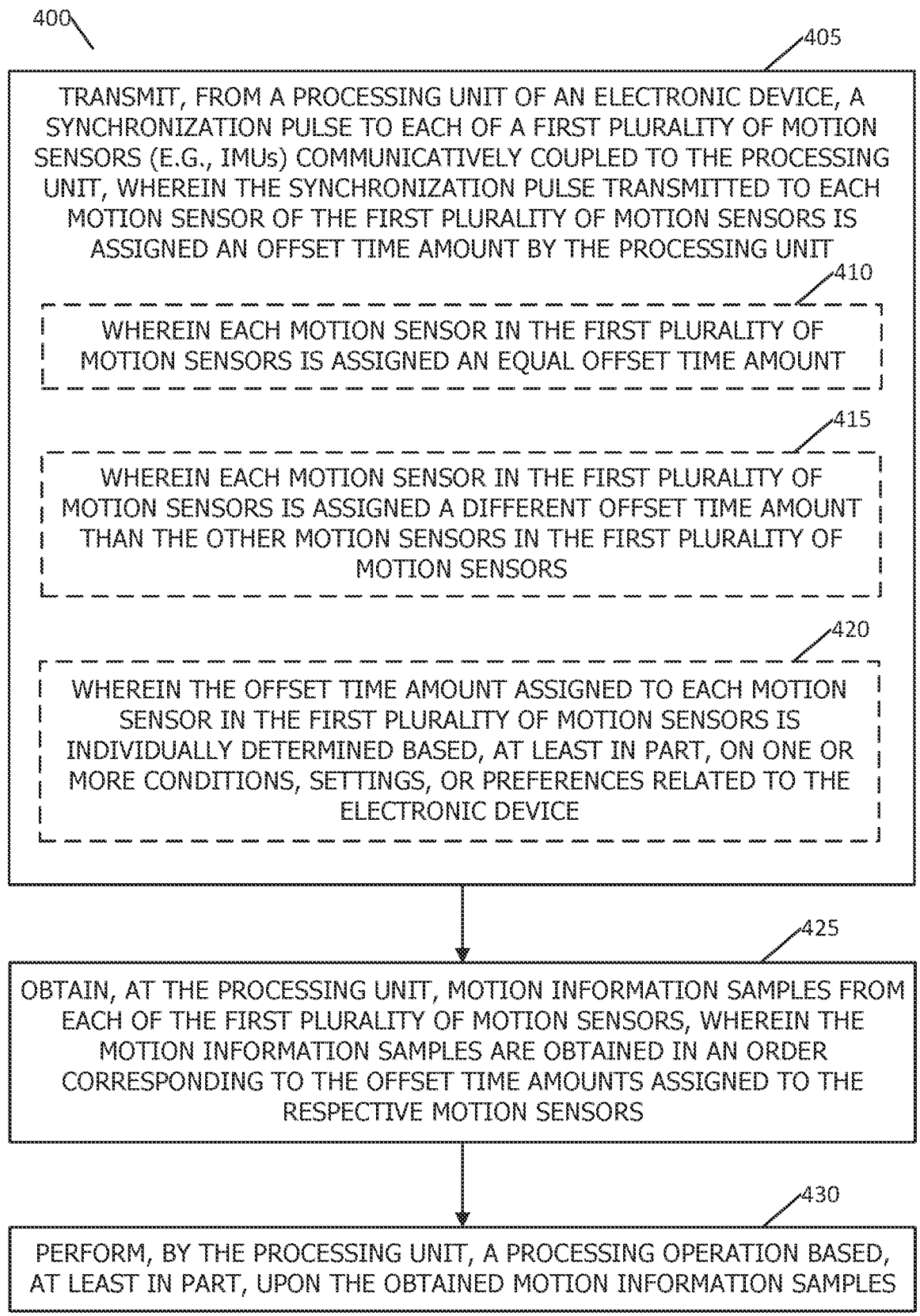
FIG. 4 shows, in flow chart form, an example technique for dynamically transmitting determined synchronization pulses to a plurality of motion sensors, according to one or more embodiments.

FIG. 4 shows, flow chart form, an example technique 400 for dynamically transmitting determined synchronization pulses to a plurality of motion sensors, in accordance with one or more embodiments. For purposes of explanation, the following steps will be described in the context of the various embodiments described above with reference to FIGS. 1-3. However, it should be understood that the various actions may be taken by alternate components. In addition, the various actions may be performed in a different order. Further, some actions may be performed simultaneously, and some may not be required, or others may be added.

The flowchart begins at 405, wherein a synchronization pulse is transmitted, from a processing unit of an electronic device, to each of a first plurality of motion sensors (e.g., IMUs) that are communicatively coupled to the processing unit, wherein the synchronization pulse transmitted to each motion sensor of the first plurality of motion sensors is assigned an offset time amount by the processing unit. In some instances, each motion sensor in the first plurality of motion sensors may be assigned an equal offset time amount (block 410), thereby allowing for the possibility of lower noise, less quantization error, and higher accuracy of the obtained data, e.g., by averaging across multiple time-aligned motion samples. In other instances, each motion sensor in the first plurality of motion sensors may be assigned a different offset time amount than the other motion sensors in the first plurality of motion sensors (block 415), thereby allowing for the possibility of lower latency motion samples when the data from each of the plurality of motion sensors is combined in chronological order.

In still other instances, the offset time amount assigned to each motion sensor in the first plurality of motion sensors may be individually determined (e.g., in a dynamic fashion) based, at least in part, on one or more conditions, settings, or preferences related to the electronic device (block 420). For example, in the case of an electronic device with 8 motion sensors, in some instances, the electronic device may assign 8 different offset time amounts to the motion sensors (i.e., a different offset time for each motion sensor), providing for minimum latency between information samples. In other instances, the electronic device may assign a single offset time amount to all 8 of the motion sensors, providing for maximum accuracy in the information samples. In still other instances, the electronic device may assign a first offset time amount to 4 of the motion sensors and a second offset time amount to the other 4 of the motion sensors, thereby providing a blend between maximum accuracy and minimum latency in the information samples. Moreover, the distribution (and values) of the assigned offset time amounts for each of the motion sensors may change dynamically, based on an activity being performed by a user of the device, a preference of a user of the device, a software setting of the device, a remaining power, processing, or thermal budget of the device, etc.

The flowchart continues at 425, wherein the motion information samples are obtained, at the processing unit, from each of the first plurality of motion sensors, e.g., in an order corresponding to the offset time amounts assigned to the respective motion sensors at block 405. Finally, at block 430, the processing unit may perform a processing operation (e.g., VIO, SLAM, etc.) based, at least in part, upon the obtained motion information samples.

Figure 5:
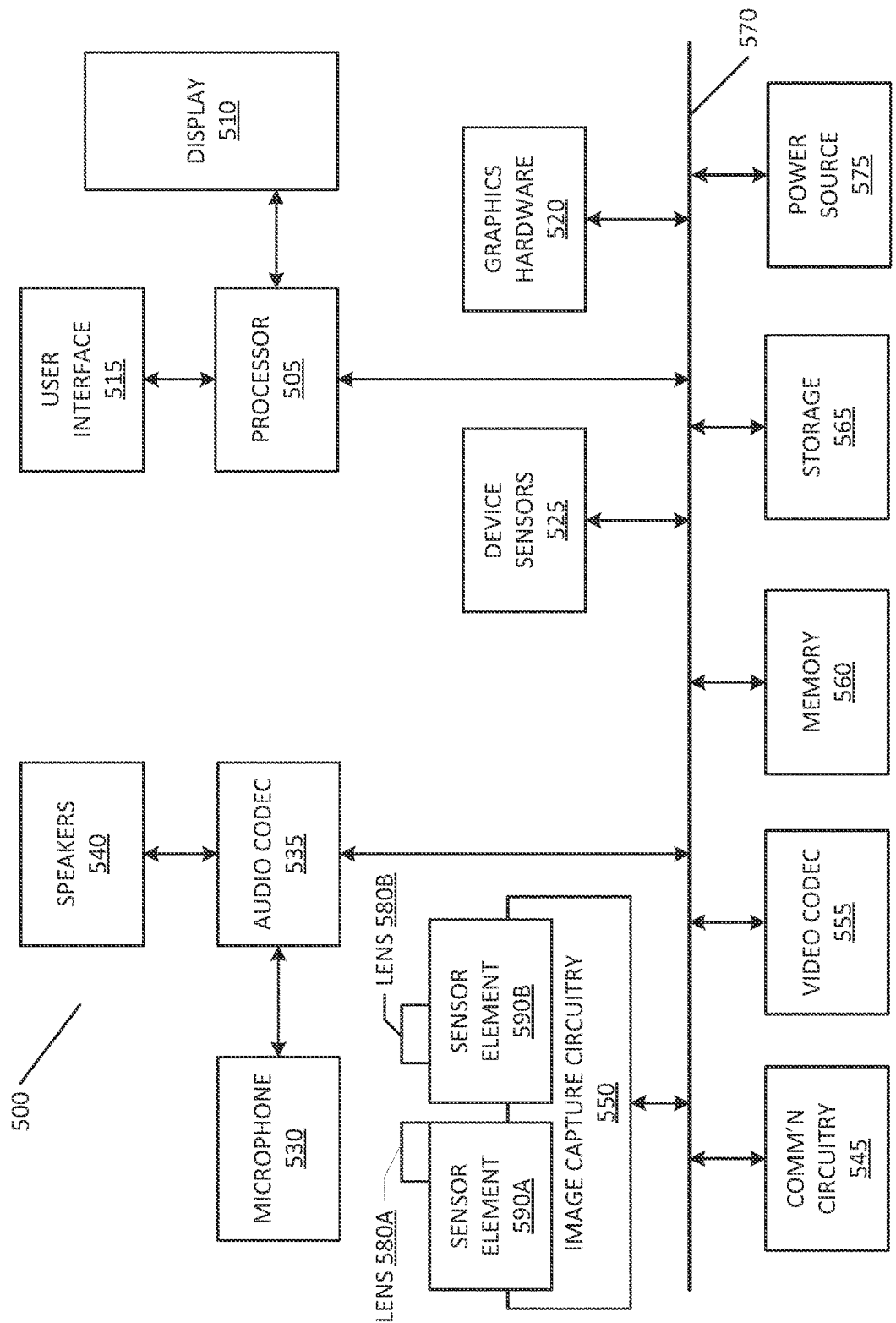
FIG. 5 shows, in block diagram form, a simplified multifunctional device according to one or more embodiments.

Referring now to FIG. 5, a simplified functional block diagram of illustrative multifunction electronic device 500 is shown according to one embodiment.

Multifunction electronic device 500 may include processor 505 (e.g., processor 505 may comprise an example of a processing unit, as used herein), display 510, user interface 515, graphics hardware 520, device sensors 525 (e.g., proximity sensor/ambient light sensors, inertial measurement units (IMUs), accelerometers, and/or gyroscopes), microphone 530, audio codec(s) 535, speaker(s) 540, communications circuitry 545, digital image capture circuitry 550 (e.g., including a camera system) video codec(s) 555 (e.g., in support of digital image capture unit), memory 560, storage device 565, and communications bus 570. Multifunction electronic device 500 may be, for example, a digital camera or a personal electronic device such as a personal digital assistant (PDA), personal music player, mobile telephone, or a tablet computer.

Processor 505 may execute instructions necessary to carry out or control the operation of many functions performed by electronic device 500 (e.g., such as the generation and/or processing of motion information samples, as disclosed herein). Processor 505 may, for instance, drive display 510 and receive user input from user interface 515. User interface 515 may allow a user to interact with device 500. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable GPU.

Image capture circuitry 550 may include two (or more) lens assemblies 580A and 580B, where each lens assembly may have a separate focal length. For example, lens assembly 580A may have a short focal length relative to the focal length of lens assembly 580B. Each lens assembly may have a separate associated sensor element 590. Alternatively, two or more lens assemblies may share a common sensor element. Image capture circuitry 550 may capture still and/or video images. Output from image capture circuitry 550 may be processed, at least in part, by video codec(s) 555 and/or processor 505 and/or graphics hardware 520, and/or a dedicated image processing unit or pipeline incorporated within circuitry 565. Images so captured may be stored in memory 560 and/or storage 565.

Sensor and camera circuitry 550 may capture still and video images that may be processed in accordance with this disclosure, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A data processing method, comprising:
    transmitting, from a processing unit of an electronic device, a synchronization pulse to each of a first plurality of motion sensors communicatively coupled to the processing unit, wherein the synchronization pulse transmitted to each motion sensor of the first plurality of motion sensors is assigned an offset time amount by the processing unit, wherein the assigned offset time for at least one of the plurality of motion sensors is determined such that an overall latency of motion information samples obtained by the first plurality of motion sensors is lower than a latency of any individual motion sensor of the first plurality of motion sensors;
    obtaining, at the processing unit, motion information samples from each of the first plurality of motion sensors, wherein the motion information samples are obtained in an order corresponding to the offset time amounts assigned to the respective motion sensors; and
    performing, by the processing unit, a processing operation based, at least in part, upon the obtained motion information samples.

2. The method of claim 1, wherein the offset time amount assigned to each motion sensor in the first plurality of motion sensors is individually determined based, at least in part, on one or more conditions, settings, or preferences related to the electronic device.

3. The method of claim 1, wherein the electronic device further comprises at least one image sensor device, and wherein the at least one image sensor device is synchronized with at least one of the plurality of motion sensors.

4. The method of claim 1, wherein the electronic device further comprises at least one image sensor device, and wherein the at least one image sensor device is not synchronized with at least one of the plurality of motion sensors.

5. The method of claim 1, wherein the processing operation comprises a visual inertial odometry (VIO) operation, a simultaneous localization and mapping (SLAM) operation, or a pose prediction operation.

6. The method of claim 1, wherein the electronic device comprises a wearable device comprising at least one image sensor device.

7. The method of claim 1, wherein at least one of the first plurality of motion sensors comprises an inertial measurement unit (IMU).

8. The method of claim 1, wherein two or more motion sensors in the first plurality of motion sensors are assigned an equal offset time amount.

9. The method of claim 8, wherein the processing operation comprises performing an averaging operation on the obtained motion information samples.

10. The method of claim 1, wherein each motion sensor in the first plurality of motion sensors is assigned a different offset time amount than the other motion sensors in the first plurality of motion sensors.

11. The method of claim 10, wherein the processing operation comprises performing a time-averaging operation on the obtained motion information samples.

12. The method of claim 1, wherein the first plurality of motion sensors comprises a first group of motion sensors and a second group of motions sensors.

13. The method of claim 12, wherein each motion sensor in the first group of motion sensors is assigned an equal offset time amount.

14. The method of claim 13, wherein each motion sensor in the second group of motion sensors is assigned a different offset time amount than the other motion sensors in the second group.

15. A non-transitory computer readable medium comprising computer readable code executable by one or more processing units to:
  transmit, from a processing unit of an electronic device, a synchronization pulse to each of a first plurality of motion sensors communicatively coupled to the processing unit, wherein the synchronization pulse transmitted to each motion sensor of the first plurality of motion sensors is assigned an offset time amount by the processing unit, wherein the assigned offset time for at least one of the plurality of motion sensors is determined such that an overall latency of motion information samples obtained by the first plurality of motion sensors is lower than a latency of any individual motion sensor of the first plurality of motion sensors;
  obtain, at the processing unit, motion information samples from each of the first plurality of motion sensors, wherein the motion information samples are obtained in an order corresponding to the offset time amounts assigned to the respective motion sensors; and
  perform, by the processing unit, a processing operation based, at least in part, upon the obtained motion information samples.

16. The non-transitory computer readable medium of claim 15, wherein two or more motion sensors in the first plurality of motion sensors are assigned an equal offset time amount.

17. The non-transitory computer readable medium of claim 15, wherein the offset time amount assigned to each motion sensor in the first plurality of motion sensors is individually determined based, at least in part, on one or more conditions, settings, or preferences related to the electronic device.

18. A system, comprising:
  one or more processing units;
  a first plurality of motion sensors, each communicatively coupled to at least one of the one or more processing units; and
  one or more computer readable media, comprising computer readable code stored thereon and executable by the one or more processing units to:
    transmit, from at least one of the one or more processing units, a synchronization pulse to each of the first plurality of motion sensors, wherein the synchronization pulse transmitted to each motion sensor of the first plurality of motion sensors is assigned an offset time amount by the at least one of the one or more processing units, wherein the assigned offset time for at least one of the plurality of motion sensors is determined such that an overall latency of motion information samples obtained by the first plurality of motion sensors is lower than a latency of any individual motion sensor of the first plurality of motion sensors;
    obtain, at the at least one of the one or more processing units, motion information samples from each of the first plurality of motion sensors, wherein the motion information samples are obtained in an order corresponding to the offset time amounts assigned to the respective motion sensors; and
    perform, by the at least one of the one or more processing units, a processing operation based, at least in part, upon the obtained motion information samples.

19. The system of claim 18, wherein each motion sensor in the first plurality of motion sensors is assigned a different offset time amount than the other motion sensors in the first plurality of motion sensors.

20. The system of claim 18, wherein the offset time amount assigned to each motion sensor in the first plurality of motion sensors is individually determined based, at least in part, on one or more conditions, settings, or preferences related to the system.

\* \* \* \* \*